United States Patent [19]

Song

[11] Patent Number: 4,871,095
[45] Date of Patent: Oct. 3, 1989

[54] CONTAINER FOR DISPENSING A MEASURED AMOUNT OF A GRANULATED SOLID

[76] Inventor: Won I. Song, 8806 Imperial Hwy., Downey, Calif. 90242

[21] Appl. No.: 244,326

[22] Filed: Sep. 15, 1988

[51] Int. Cl.⁴ .......................... G01F 11/28; B67D 3/00
[52] U.S. Cl. ..................................... 222/437; 222/457; 222/547; 222/564
[58] Field of Search ............... 222/454, 456, 457, 564, 222/547, 434, 437, 438

[56] References Cited

U.S. PATENT DOCUMENTS

| | | | |
|---|---|---|---|
| 1,276,382 | 8/1918 | Loveland | 222/437 |
| 1,864,936 | 6/1932 | Reineking | 222/48 |
| 2,309,234 | 1/1943 | Bonander | 222/456 |
| 2,899,115 | 8/1959 | Matter | 222/438 X |
| 3,344,962 | 10/1967 | Popivalo | 222/456 |
| 4,424,921 | 1/1984 | Feuerstein et al. | 222/456 |

Primary Examiner—Joseph J. Rolla
Assistant Examiner—Mona C. Beegle
Attorney, Agent, or Firm—Edgar W. Averill, Jr.

[57] ABSTRACT

An improved container for dispensing a measured amount of a granulated solid. The container has a circular opening formed in the top which permits the complete filling of the container. A removable, hollow tube is then inserted into the circular opening. The hollow tube extends to the bottom of the box and has an opening therein which cooperates with a partition within the box to provide a measured pour.

17 Claims, 2 Drawing Sheets

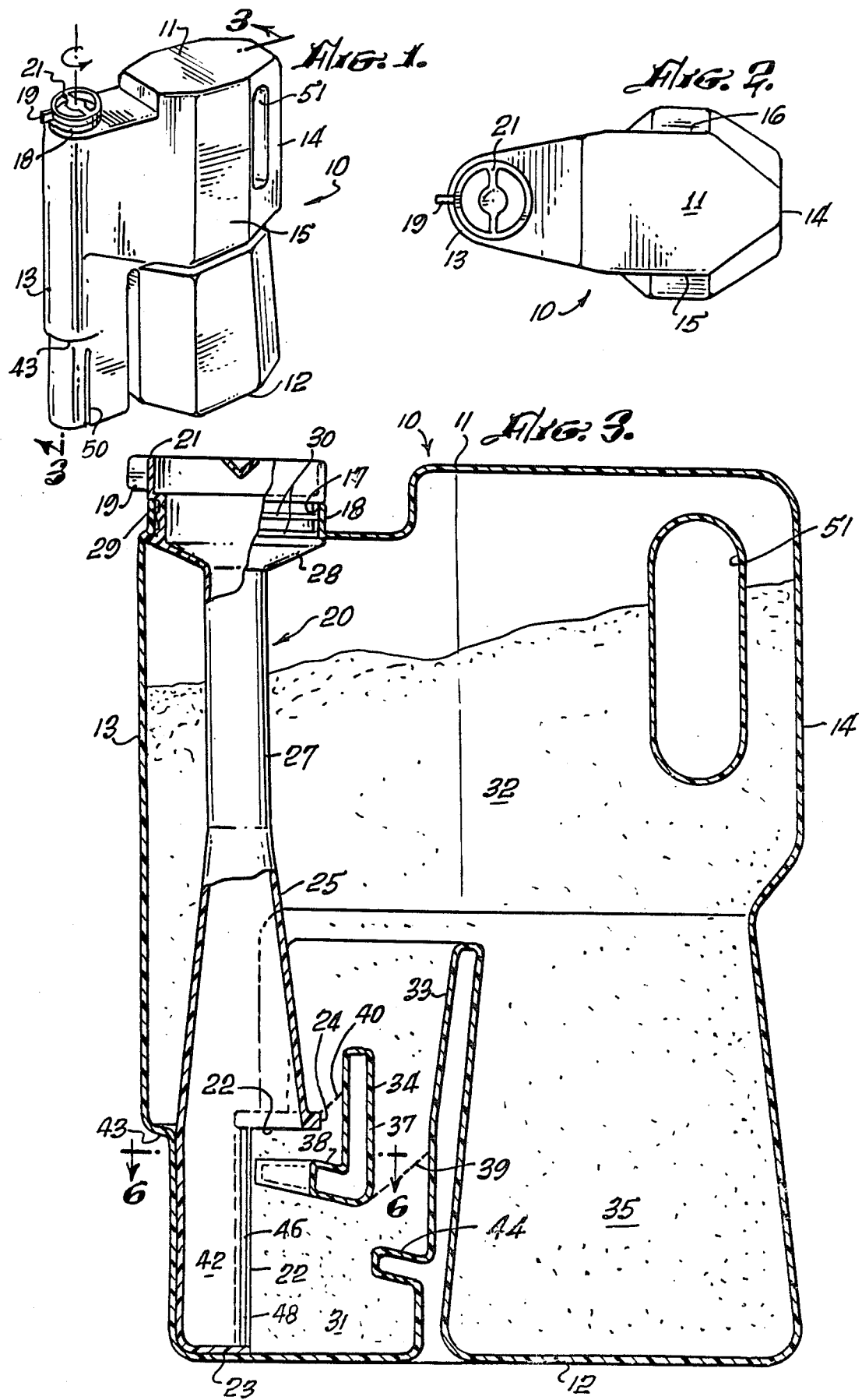

U.S. Patent    Oct. 3, 1989    Sheet 2 of 2    4,871,095
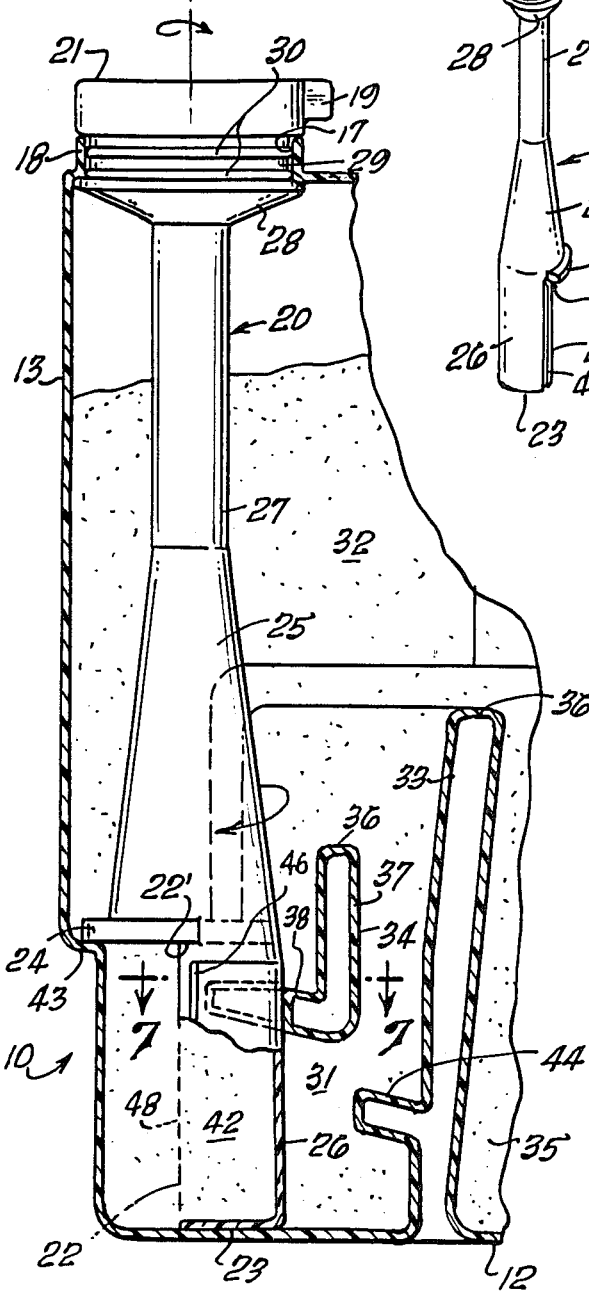
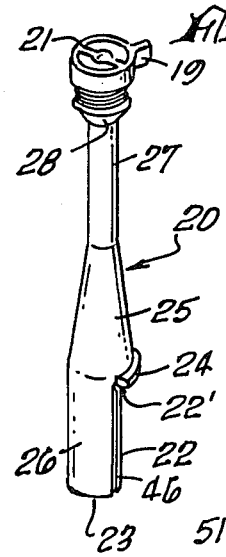
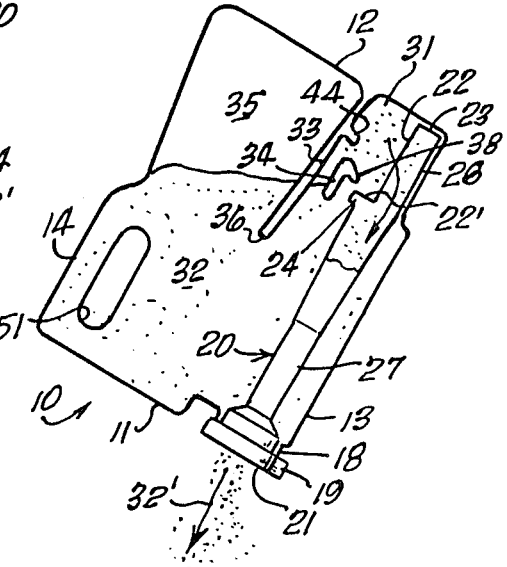
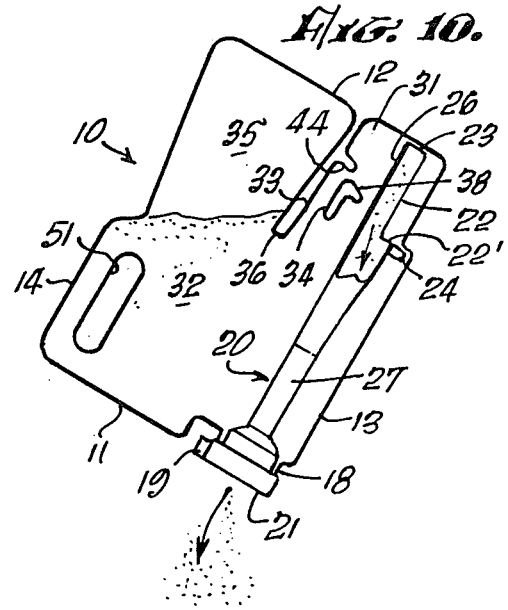
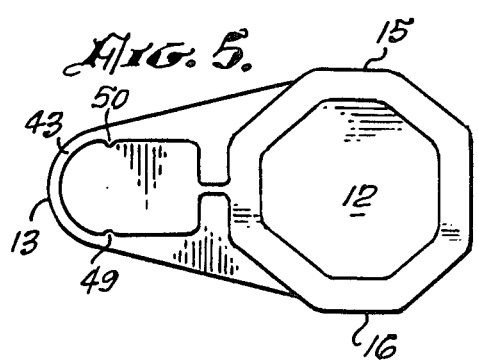
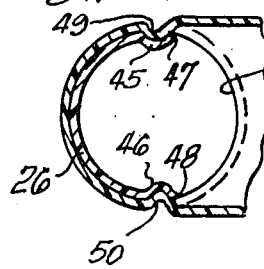
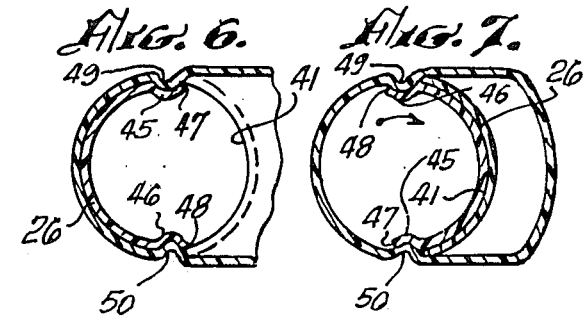

CONTAINER FOR DISPENSING A MEASURED AMOUNT OF A GRANULATED SOLID

BACKGROUND OF THE INVENTION

The field of the invention is containers, and the invention relates more particularly to containers of the type used for granulated solids such as laundry detergent.

For many uses, the same predetermined amount of a granulated solid is used each time the container is used. For instance, for a laundry detergent, a volume such as one cup is frequently used. Typically, the measuring operation requires the use of a separate cup, and often the amount poured into the cup exceeds the amount of the cup resulting in spillage. Also, the cup is easily mislaid, making measuring a matter of guesswork.

Applicant has provided one design to accomplish this result in U.S. Pat. No. 4,667,857. The filling of such container, however, required that the entire top be openable. Such design would not be practical for a blow molded container. Blow molded, plastic containers are low in cost, light in weight and attractive in appearance.

SUMMARY OF THE INVENTION

It is an object of the present invention to provide a low cost container for dispensing a measured amount of a granulated solid.

It is another object of the present invention to provide a low cost container which may be formed by blow molding.

The present invention is for an improved container for dispensing a measured amount of a granulated solid. The container is of the type which is generally rectangular in shape, having a top, a bottom, a front or pouring end, a back or handle end, a first side and a second side. The improved container has a circular opening formed in the top of the container near the pouring end, said circular opening including a cylindrical portion. The container is free from any impediments to essentially complete filling through the circular opening. A removable, hollow tube is securely held by said cylindrical portion of said circular opening. Said hollow tube has a top and a bottom and extends from the cylindrical opening in the container to the bottom of the container. The hollow tube has a bottom portion with a circular, cross-sectional shape and having an opening formed in the bottom thereof extending upwardly from the bottom to an open top. The tube is turnable within the container so that the opening faces generally forward in a first position and faces generally rearwardly in a second position. A generally L-shaped partition having a vertical portion and a generally horizontal portion is formed in the container. The generally horizontal portion has an arcuate edge which fits against the outer surface of the hollow tube, and the generally horizontal portion is formed in the container below the open top in the hollow tube. A measuring compartment is formed in the container between the bottom, sides and the pouring edge thereof by a partition extending upwardly from the bottom thereof and terminating within said container. Preferably, the hollow tube has a semicircular, horizontal ring extending outwardly therefrom at the upper edge of the opening top. Preferably, the container is indented near the bottom of the front edge just below the horizontal ring of the hollow tube. Also preferably, the hollow tube is narrowed between the top and the opening and has an indicator tab on the top thereof. The container is preferably formed from a translucent plastic by the blow molding process.

BRIEF DESCRIPTION OF THE DRAWINGS

FIG. 1 is a perspective view of the improved container for dispensing a measured amount of a granulated solid of the present invention.

FIG. 2 is a top plan view thereof.

FIG. 3 is an enlarged cross-sectional view taken along line 3—3 of FIG. 1.

FIG. 4 is a cross-sectional side view analogous to the front portion of FIG. 3 with the hollow tube therein turned 180°.

FIG. 5 is a bottom plan view of the container of FIG. 1.

FIG. 6 is a cross-sectional view taken along line 6—6 of FIG. 3.

FIG. 7 is a cross-sectional view taken along line 7—7 of FIG. 4.

FIG. 8 is a perspective view of the hollow tube of the container of FIG. 1.

FIG. 9 is a cross-sectional side view showing the container of FIG. 1 in a pouring position with the hollow tube in a full cup measuring position.

FIG. 10 is a cross-sectional side view of the container of FIG. 1 with the hollow tube in a half measure configuration.

DESCRIPTION OF THE PREFERRED EMBODIMENTS

The improved container for dispensing a measured amount of a granulated solid is shown in perspective view in FIG. 1 and indicated by reference character 10. Container 10 is generally rectangular in that it has a top 11, a bottom 12, a front or pouring edge 13, a back or handle edge 14, a first side 15 and a second side 16.

As shown best in FIG. 3, container 10 has an opening 17 which has a cylindrical portion 18. A hollow tube generally indicated by reference character 20 is removable from opening 17, and when hollow tube 20 is removed, the container may be easily and completely filled through opening 17. This provides an important practical feature for automated filling operations.

Hollow tube 20 has a tab 19 formed at the top 21 to indicate the position of the opening at the bottom of the tube. The hollow tube is shown in perspective view in FIG. 8 where it can b seen that tube 20 has a generally semicircular opening 22 which extends from the bottom 23 of tube 20 about one-quarter of the length of the tube and terminates in an outwardly extending ring 24 at the opening top 22'. Tube 20 has a frusto-conical portion 25 between a generally cylindrical portion 26 around the balance of the periphery where opening 22 is located. A narrow, cylindrical portion 27 terminates in an upper frusto-conical portion 28 which, in turn, terminates in a generally cylindrical portion 29 having a plurality of outwardly extending rings 30 which fit tightly within cylindrical portion 18. Of course, the tube 20 may be turned 360° within opening 17.

As shown best in FIG. 3, when tube 20 is turned so that tab 19 is facing forwardly, opening 22 is accessible to the granulated solid which is in the measuring area 31 described below. Thus, when the container is turned, as shown in FIG. 9, a certain amount of the granulated solid (indicated by reference character 32) will pass through the hollow tube and out of the container as indicated by arrow 32'.

The manner in which the container and tube results in a measured pour results from the interaction of dividing partition 33 and generally L-shaped partition 34. Dividing partition 33 functions to retain a level of granulated solid in measuring area 31 above L-shaped partition 34 until the contents of container 10 are essentially completely dispensed. It can be readily understood that granulated solid in storage area 35 will end to move toward measuring area 31 during a pouring operation. Then when the level of granulated solid has dropped, for instance below the top 36 of dividing partition 33, a pour will cause granulated solid from storage area 35 to flow into measuring area 31 where it can be accurately dispensed.

L-shaped partition 34 has a generally vertical portion 37 and a generally horizontal portion 38. As container 10 is rotated in a counter-clockwise direction from its position, as viewed in FIG. 3, toward the position shown in FIG. 9, the granulated solid in measuring area 31 below about dotted lines 39 and 40 flows out through the interior of hollow tube 20. As the container is again rotated, this time back from the position shown in FIG. 9 to that shown in FIG. 3, the measuring area 31 is completely filled from the storage area 35 and any filled area above the top 36 of partition 33. This area below dotted lines 39 and 40 is formed in a desired volume such as one cup depending upon the product to be dispensed.

In order to dispense a smaller but measured amount, tab 19 is turned in a rearward direction as shown in FIG. 4. The outer surface of generally cylindrical portion 26 closely abuts the inner edge 41 of the generally horizontal portion 38 of L-shaped partition 34. This is shown clearly in FIG. 7. This turning step, of course, is done when the container is in a vertical position and, thus, a portion of granulated solid, indicated by reference character 42 in FIG. 4, is captured and allowed to pour out when the container is turned to the position shown in FIG. 10. Once the container has again been uprighted to the position in FIG. 4, tab 19 is once again turned in a forward position where either a full cup may be dispensed, as indicated in FIGS. 3 and 9, or once again turned to have a half cup dispensed as shown in FIGS. 4 and 10.

The horizontal ring 24 assists in limiting the amount of granulated solid which fills measuring area 31. Container 10 is indented at reference character 43 to provide room for ring 24. Partition 44 is useful during a rapid pour. For instance, if container 10 is rapidly turned to the position shown in FIG. 9, partition 44 will prevent a portion of the granulated solid from flowing back into the container between partitions 34 and 33. Partition 44 is preferably about half way between the bottom of the container and the horizontal portion 38 of partition 34. Partition 44 is referred to herein as a flow back preventing partition. Flow back preventing partition 44 extends in a generally horizontal direction from the dividing partition 33 and extends into the measuring area 33 to about the same vertical line as generally 33.

Preferably, opening 22 extends more than 180° around the cylindrical portion 26 as shown clearly in FIGS. 6 and 7. In this way, a pair of indentations 45 and 46 may be formed along the vertical edges 47 and 48 of opening 22. These indentations match a pair of ridges 49 and 50 formed in the walls of container 10 so that the two positions of hollow tube 20 can be easily felt by the user. Thus, in FIG. 6, a stable, full measure position is indicated, and in FIG. 7, a stable, partial measure is indicated. It can also be seen in FIGS. 6 and 7 that the opening of the hollow tube extends less than 180° around the tube.

The narrowing of tube 20 permits additional granulated material to be placed in the container. The amount of narrowing would depend upon the nature of the granulated solid to be dispensed in that such narrowing should not be so much that the pouring process would be interfered with.

Preferably, the container of the present invention is fabricated by the process of blow molding. This provides a low cost, lightweight container which may also be readily made somewhat translucent so that the user can easily determine the amount of material within the container. Tube 20 is also preferably blow molded and such process may be readily automated to provide a low cost part. In a filling operation, the container 10 would be filled without tube 20 in place. The container would, then, preferably be rotated so that the pouring edge 13 is facing upwardly so that the granulated solid does not interfere with the insertion of tube 20. A handle may be easily formed in a conventional blow molding operation, and such handle is indicated by reference character 51. The result is an exceptionally easy-to-use container which may easily dispense two different measured amounts of a granulated solid such as laundry detergent. Other products such as granulated pool chlorine may also be efficiently dispensed with the use of the container of the present invention.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved container for dispensing a measured amount of a granulated solid, said container being of the type which is generally rectangular in shape having a top, a bottom, a front or pouring edge, a back or handle edge, a first side and a second side, said container comprising:

a circular opening formed in the top of said container near the pouring edge, said circular opening including a cylindrical portion, said container being free of any impediments to essentially complete filling through said circular opening;

a removable, hollow tube securely held by said cylindrical portion of said circular opening, said hollow tube having a top and a bottom and extending from said cylindrical opening to the bottom of said container, said tube having a bottom portion with a circular cross-sectional shape, the side wall of said bottom portion having an opening formed therein extending upwardly from the bottom to an opening top, said tube being turnable within said container so that said opening faces generally forward in a first position and faces generally rearwardly in a second position;

a generally L-shaped partition formed in said container, said partition having a generally vertical portion and a generally horizontal portion having an arcuate edge which fits against the outer surface of the hollow tube and said generally horizontal portion being formed below said opening top; and a measuring compartment formed in said container between the bottom, sides and the pouring edge thereof by a partition extending upwardly from the bottom thereof and terminating within said container.

2. The improved container of claim 1 wherein said hollow tube has a semi-circular, horizontal ring extending outwardly therefrom at the upper edge of said opening top.

3. The improved container of claim 2 wherein said container is indented near the bottom of said front edge at the location just below said horizontal ring of said hollow tube.

4. The improved container of claim 1 wherein said hollow tube is narrowed between said top thereof and said opening top.

5. The improved container of claim 1 wherein said hollow tube has an indicator tab formed at the top of said hollow tube.

6. The improved container of claim 1 wherein said hollow tube has a pair of opposed vertical indentations formed near the edges of the opening of said tube and the container walls have a pair of inwardly facing ridges which mate with the indentations of the tube so that the tube has two fixed positions when said indentations of said tube mate with the ridges of the container.

7. An improved blow molded plastic container for dispensing a measured amount of a granulated solid, said container being of the type which is generally rectangular in shape having a top, a bottom, a front or pouring edge, a back or handle edge, a first side and a second side, said container comprising:

a circular opening formed in the top of said container near the pouring edge, said circular opening including a cylindrical portion, said container being free of any impediments to essentially complete filling through said circular opening;

a removable, hollow tube securely held by said cylindrical portion of said circular opening, said hollow tube having a top and a bottom and extending from said cylindrical opening to the bottom of said container, said tube having a bottom portion with a circular cross-sectional shape, the side wall of said bottom portion and having an opening extending upwardly from the bottom to an opening top, said tube being turnable within said container so that said opening faces generally forward in a first position and faces generally rearwardly in a second position;

a generally L-shaped partition formed from the sides of said container having a generally vertical portion and a generally horizontal portion having an arcuate edge which fits against the outer surface of the hollow tube, and said generally horizontal portion being formed below said opening top; and a measuring compartment formed between the sides of said container extending to the bottom thereof by a dividing partition extending upwardly from the bottom thereof and terminating within said container, said partition having a web between the measuring compartment and the remainder of the container.

8. The improved container of claim 7 wherein said opening of said hollow tube has vertical sides and extends less than 180° around the sides of said tube.

9. The improved container of claim 7 wherein said container is translucent.

10. The improved container of claim 7 wherein said hollow tube has a semi-circular, horizontal ring formed therein extending outwardly therefrom at said opening top.

11. The improved container of claim 10 wherein said container is indented near the bottom of said front edge at the location just below said horizontal ring of said hollow tube.

12. The improved container of claim 10 wherein said hollow tube is blow molded and is narrowed between said top thereof and said opening top and is widened from a point above said horizontal ring.

13. The improved container of claim 7 wherein said hollow tube has an indicator tab formed at the top of said hollow tube.

14. The improved container of claim 7 wherein said opening of said hollow tube extends less than 180° around said hollow tube, and said hollow tube has a pair of opposed vertical indentations formed near the edges of the opening of said tube, and the container walls have a pair of inwardly facing ridges which mate with the indentations of the tube so that the tube has two fixed positions when said indentations of said tube mate with the ridges of the container.

15. The improved container of claim 7 wherein said container has a handle formed therein in the handle side thereof near the top thereof.

16. The improved container of claim 7 further including a flow back preventing partition extending in a generally horizontal direction from said dividing partition into said measuring area, said flow back partition being formed above the bottom of the container and below the generally L-shaped partition and extending outwardly from said dividing partition an amount about equal to the generally vertical portion of the generally L-shaped partition.

17. The improved container of claim 16 wherein said flow back partition is located horizontally about an equal distance between the bottom of said container and the bottom of the generally horizontal portion of said generally L-shaped partition.

* * * * *